United States Patent
Wohlers et al.

(10) Patent No.: US 12,517,206 B1
(45) Date of Patent: Jan. 6, 2026

(54) TRANSFER OF AN IMAGE IMPRESSION BETWEEN DIFFERENT MAGNETIC RESONANCE IMAGING SYSTEMS

(71) Applicant: Siemens Healthineers AG, Forchheim (DE)

(72) Inventors: Julian Wohlers, Erlangen (DE); Tobias Würfl, Erlangen (DE); Jens Gühring, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 19/257,795

(22) Filed: Jul. 2, 2025

(30) Foreign Application Priority Data

Jul. 5, 2024 (DE) ............... 10 2024 206 359.2

(51) Int. Cl.
- *G01V 3/00* (2006.01)
- *G01R 33/36* (2006.01)
- *G01R 33/54* (2006.01)
- *G01R 33/56* (2006.01)
- *G01R 33/58* (2006.01)

(52) U.S. Cl.
CPC ......... *G01R 33/58* (2013.01); *G01R 33/3607* (2013.01); *G01R 33/543* (2013.01); *G01R 33/5608* (2013.01)

(58) Field of Classification Search
CPC .. G01R 33/58; G01R 33/3607; G01R 33/543; G01R 33/5608
USPC .......................................... 324/309
See application file for complete search history.

(56) References Cited

U.S. PATENT DOCUMENTS

2012/0041302 A1* 2/2012 Nilson ................. A61B 6/0492
600/427

FOREIGN PATENT DOCUMENTS

EP 3379281 A1 * 9/2018 ............... G06T 7/11

OTHER PUBLICATIONS

Jun. 4, 2025 (DE) Decision to Grant—App. 102024206359.2 (English Translation).
Jun. 4, 2025 (DE) Decision to Grant—App. 102024206359.2 (German).

* cited by examiner

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

Techniques are described for transferring an image impression between different magnetic resonance imaging systems is described. Reference image data is generated from a phantom for a plurality of different pulse sequence protocols with different parameter settings using a first magnetic resonance imaging system. New image data is also generated from the phantom for the plurality of different pulse sequence protocols with different parameter settings using a second magnetic resonance imaging system different from the first magnetic resonance imaging system. Adapted parameter values for the different parameter settings of the second magnetic resonance imaging system are ascertained based on a result of a cost function that quantifies the similarity between the image impression of the new image data and the image impression of the reference image data. Finally, the parameter settings in the second magnetic resonance imaging system are adjusted with the adapted parameter values.

13 Claims, 2 Drawing Sheets

TRANSFER OF AN IMAGE IMPRESSION BETWEEN DIFFERENT MAGNETIC RESONANCE IMAGING SYSTEMS

CROSS-REFERENCE TO RELATED APPLICATIONS

The present application claims priority to and the benefit of Germany patent application no. DE 10 2024 206 359.2, filed on Jul. 5, 2024, the contents of which are incorporated herein by reference in their entirety.

TECHNICAL FIELD

The disclosure relates to a method for transferring an image impression between different magnetic resonance imaging systems, to a transfer facility, and to a magnetic resonance imaging system.

BACKGROUND

In diagnostic imaging, it remains a challenge to enable consistent image impressions across different scanner models and different software. This can be attributed to the different capturing and/or reconstruction technologies available as well as different acceleration technologies, different hardware configurations, hardware differences, and hardware tolerances.

These differences lead to workflow problems, since both medical technical assistants (MTRAs) and radiologists are trained on certain image impressions. Technicians may not be able to carry out their quality assurance as planned, and radiologists can have difficulty in furnishing imaging with a commentary, e.g. in annotating and interpreting images, when image impressions change. The latter is particularly important in cases where longitudinal sectional observations of patients are required to establish the progression of certain diseases, such as multiple sclerosis, or for tumor follow-ups (for tracking former cancer patients or monitoring during treatment, e.g. with respect to a patient's chemotherapy and/or radiotherapy).

This makes it difficult to introduce new technologies in this field, since customers or users want to avoid the aforementioned problems and spare themselves the effort of adapting a newly-available technology to the image impressions they are familiar with. This reluctance leads to lower market penetration with new technology than would be otherwise possible. Therefore, patients are often not scanned with optimal programs, and the efficiency of the new system for customers or users does not reach its full potential.

Previous attempts to solve this issue involved a very cumbersome process, as an application specialist familiar with both the old and new technologies attempted to achieve the same image impression with the new technologies as was achieved with the old technology, while simultaneously optimizing scan time and/or resolution.

Such a process is based on a mixture of trial and error and educated guesswork, and requires a great deal of experience on the part of application specialists. This leads to a number of problems, some of which are listed below.

For instance, finding a comparable starting point for configuring a computer program for imaging requires profound understanding. However, it is becoming increasingly difficult to find qualified personnel to take on this task. In addition, since the technology portfolio is growing over time, the amount of knowledge required for this task increases over time.

Since there is no objective definition of image impression, and this is a trial-and-error approach, numerous experiments and evaluations with customers are required to achieve the desired results. Furthermore, this cannot usually be achieved with pure phantom tests, as patients are also required, and application specialists frequently require multiple trials and customer visits.

Since this approach depends solely on the person performing it, it is only possible to a very limited extent to maintain and ensure consistent quality so that an optimum setting is achieved.

SUMMARY

In light of these issues, if an automatic or semi-automatic process were possible that would at least provide a starting point for the program settings, this would improve the current approach enormously. Therefore, an object of the present disclosure is to develop a method and an apparatus for transferring an image impression between different magnetic resonance imaging systems, or magnetic resonance imaging systems with different states with improved reliability that are independent of the skills of a specialist.

This object is achieved by the various embodiments as discussed in further detail herein, such as method for transferring an image impression between different magnetic resonance imaging systems, a transfer facility, a magnetic resonance imaging system, as well as the embodiments as described in the claims.

In an embodiment of a method for transferring an image impression between different magnetic resonance imaging systems, reference image data is generated from a phantom for a plurality of different pulse sequence protocols with different parameter settings using a first magnetic resonance imaging system. The term "different magnetic resonance imaging systems" should not only be understood to mean magnetic resonance imaging systems with different technical properties, e.g. different hardware, but also magnetic resonance imaging systems with the same or identical hardware running different software or different versions of software. The reference image data is recorded from a phantom, which may for instance be positioned reproducibly and for instance arranged in a coordinate system of the scanning unit of the magnetic resonance imaging system at a predetermined position with a predetermined pose. The coordinate system may for example be made recognizable with the aid of markings in the reference image data that are visualized by magnetic resonance imaging.

In addition, new image data is generated from the phantom for the plurality of different pulse sequence protocols with the different parameter settings using a second magnetic resonance imaging system. The second magnetic resonance imaging system differs from the first magnetic resonance imaging system in terms of its hardware and/or software and it can therefore be expected that, if the pulse sequence protocols were adopted unchanged for one and the same pulse sequence protocol with one and the same parameter settings on different magnetic resonance imaging systems, differences would occur with regard to the image impression.

To compensate for these differences in the image impression, adapted parameter values for the different parameter settings of the pulse sequence protocols of the second magnetic resonance imaging system are therefore generated based on a result of a cost function that quantifies the similarity between the image impression of the new image data and the image impression of the reference image data.

A cost function should be understood to be a function that can be used to adjust two systems. In this case, the aim is that the parameterization of the system of the second magnetic resonance imaging system is adjusted such that the output images appear as similar as possible to the images of the first magnetic resonance imaging system in terms of their image impression. The cost function returns a type of "error" or "deviation" between the image impressions of the two systems, and can be used to ascertain an optimum with the aid of known methods such as regression or gradient descent. Herein, as many sets of image data as possible, e.g. all sets of image data (reference image data and new image data) that are generated with different pulse sequence protocols, are included in the cost function.

Finally, the adapted parameter values are used to adjust the parameter settings of the different pulse sequence protocols in the second magnetic resonance imaging system to adjust the image impression on the second magnetic resonance imaging system to the image impression of the first magnetic resonance imaging system.

Advantageously, an adaptation of the parameter settings of pulse sequence protocols can be automated. Herein, the use of the cost function replaces adaptation by a specialist or the user of the old and new magnetic resonance imaging system. If, in addition to the image impression, further image properties or optimization targets, e.g. the resolution or the speed, are to be set, their desired features can be included within the cost function. This relieves the user of a particularly complex set of tasks and greatly facilitates migration between different systems.

The transfer facility according to the disclosure has a reference data receiving unit. The reference data receiving unit is configured to receive reference image data from a phantom for a plurality of different pulse sequence protocols with different parameter settings from a first magnetic resonance imaging system.

The transfer facility according to the disclosure also has an image data generating unit for generating new image data from the phantom for the plurality of different pulse sequence protocols with the different parameter settings with a second magnetic resonance imaging system. To generate the new image data, pulse sequences based on the different pulse sequence protocols are transmitted to a scanning unit of the second magnetic resonance imaging system. The phantom already used for generating the reference image data is arranged in the second magnetic resonance imaging system. Raw data from the phantom is now captured using the pulse sequences and the new image data is reconstructed based on the captured raw data. A reconstruction unit already present in a control facility of the second magnetic resonance imaging system can also be used for this purpose.

Furthermore, the transfer facility according to the disclosure comprises an ascertaining unit for ascertaining adapted parameter values for the different parameter settings of the pulse sequence protocols of the second magnetic resonance imaging system based on a result of a cost function that quantifies the similarity between the image impression of the new image data and the image impression of the reference image data. Such a cost function may e.g. be configured such that its result approaches the value zero when the image impressions of the compared image data are the same, and its result assumes a value significantly different from zero if the image impressions of the compared image data differ significantly.

Part of the transfer facility according to the disclosure is also an adaptation unit for adjusting the parameter settings in the second magnetic resonance imaging system with the adapted parameter values. For this purpose, the adapted parameter values are stored in a data storage unit of the second magnetic resonance imaging system. The transfer facility according to the disclosure shares the advantages of the method according to the disclosure for transferring an image impression between different magnetic resonance imaging systems.

The magnetic resonance imaging system according to the disclosure has the transfer facility according to the disclosure, a scanning unit, and a control facility for actuating the scanning unit based on parameter values of pulse sequence protocols adapted by the transfer facility.

A large part of the aforementioned components of the transfer facility according to the disclosure can be realized in whole or in part in the form of software modules in a processor of a corresponding computing system, for example a control facility of a magnetic resonance imaging system or a computer used to control such a system. A largely software-based implementation has the advantage that previously used computing systems can also be easily retrofitted by a software update to work in the manner according to the disclosure.

In this respect, the object is also achieved by a corresponding computer program product with a computer program, which can be loaded directly into a computing system, with program sections for executing the steps of the method according to the disclosure for transferring an image impression between different magnetic resonance imaging systems when the program is executed in the computing system. In addition to the computer program, such a computer program product can optionally comprise additional items, such as, for example, documentation and/or additional components, including hardware components, such as, for example, hardware keys (dongles etc.) for using the software.

A computer-readable medium, for example a memory stick, a hard disk, or another transportable or permanently installed data carrier on which the program sections of the computer program that can be read and executed by a computing system are stored, can be used for transport to the computing system and/or for storage on or in the computing system. The computing system can, for example, have one or more cooperating microprocessors or the like for this purpose.

The claims and the following description in each case describe embodiments and developments of the disclosure. Herein, the embodiments of one category can be developed analogously to the embodiments of another claim category. In addition, it is also possible within the context of the disclosure for the different features of different exemplary embodiments to be combined to form new exemplary embodiments.

In an embodiments of the disclosure, the first magnetic resonance imaging system and the second magnetic resonance imaging system differ with respect to at least one of the following features:

the hardware of the respective system,
the software of the respective system used for imaging.

Advantageously, both hardware and software migrations can be compensated by the method according to the disclosure, so that a user can in any case retain the familiar image impression in the event of any change to a magnetic resonance imaging system.

In an embodiment, in each case a different imaging program and/or a different pulse sequence protocol is assigned to the different parameter settings. This should be understood as meaning that imaging is performed with different objectives and/or different pulse sequences. Advantageously, a magnetic resonance imaging system can be used for very different applications and migration between different magnetic resonance imaging systems and/or different software variants or software versions is also carried out such that these different applications are possible with the same image impression or at least a comparable image impression on the new system.

In an embodiment, the adjustment of the parameter settings is carried out in such a way that the result of the cost function is iteratively optimized so that it represents an optimum similarity between the reference image data and the new image data. This advantageously achieves optimum similarity between the image impressions from different imaging systems.

In an embodiment of the method according to the disclosure, in addition to the similarity of the image impressions in dependence on the parameter settings of the pulse sequences, the cost function also comprises additional criteria with which additional objectives are pursued in addition to the similarity of the image impression and/or additional constraints are taken into account in addition to the similarity of the image impression.

In an embodiment, the additional objectives comprise one of the following objectives:
the acquisition time,
the activation of a special acceleration technique as a specific way to influence the acquisition time,
functionalities to improve image quality.

Advantageously, additional optimization objectives can be included in the adaptation process and can likewise be tracked automatically. Shortening the acquisition time can contribute to improving image quality with moving objects.

The similarity between the reference image data and the newly generated image data may e.g. be characterized by at least one of the following measured variables:
the numerical values and values derived therefrom, e.g. gray values, of the voxels of the image data,
the contrast,
the signal-to-noise ratio,
the image resolution.

Here, "numerical values" should be understood as intensity values assigned to the voxels, which are generated on the reconstruction of image data on the basis of raw data. Herein, the contrast, the signal-to-noise ratio and the image resolution are influenced by the gray values of the voxels. The comparison of the similarity of image data can therefore be carried out based on gray values of voxels, which are fully known after the image data has been recorded.

In an embodiment, the different parameter settings of the pulse sequence protocols comprise parameters which influence and/or change the image impression.

Advantageously, the image impression of the new image data can be adjusted to the image impression of the reference image data by parameter adaptation, i.e. a change and adjustment of the parameter values of the pulse sequence protocols of the new magnetic resonance imaging system.

In an embodiment, the different parameter settings comprise at least one of the following parameters:
filter parameters,
the repetition time,
the echo time,
the contrast,
the acceleration factor.

The aforementioned parameters influence the image impression in different ways.

For example, an image filter to which filter parameters are assigned influences noise suppression in the image data and thus also the image impression.

The repetition time is an important parameter for setting contrasts. For instance, the repetition time can be used to set the type of weighting, e.g. the T1 weighting. In addition, the repetition time represents one of the most important factors for the image acquisition time. Likewise, the repetition time plays a role in saturation effects, which are for instance important with very short repetition times, such as those that occur with fast sequences.

Similarly, the echo time or inversion time are also relevant for contrast formation.

The acceleration factor plays a decisive role for image quality and thus also for the image impression.

In an embodiment, the different parameter settings do not comprise the following parameters:
the slice resolution,
the number of voxels,
the image geometry,
the positioning of an examination object or phantom,
navigator parameters,
the coil setting.

The slice resolution may for instance refer to the number of slices to be mapped. This should not be changed.

The number of voxels indicates the basic resolution and likewise should not be changed so as not to change the image structure.

The image geometry may e.g. comprise the dimensions of the field of view or the dimensions of the image representations and the dimensions of the voxels and is related to the number of voxels. Likewise, it should remain the same.

Likewise, the positioning of the phantom in the isocenter should remain unchanged to enable a voxel-by-voxel comparison.

The navigator setting should also remain unchanged so as not to change the image geometry.

The coil setting relates to the use of local receive coils and their arrangement, which should likewise remain the same for a specific type of imaging.

In a variant of the method according to the disclosure, the reference image data comprises a representative sub-region of the entire region of interest. The reference image data may for instance comprise a single image slice. Advantageously, the recording time for recording reference image data can be kept small or even minimal. In addition, the memory requirement and the resources required for processing the reference image data can be kept small or even minimal.

Likewise, an automated adjustment of the parameters of pulse sequence protocols on the second magnetic resonance imaging system may be provided. Advantageously, adaptation can take place independently of the expertise of individual specialists.

Likewise, semi-automated adjustment of the parameters of the pulse sequence protocols may also be provided. Herein, an expert is automatically presented with a proposal for adjusting the parameters of the pulse sequence protocols for the second magnetic resonance imaging system. The expert then has the option of modifying or confirming the pulse sequence protocols. In an additional step, the expert's changes are automatically checked and the expert receives the result of the check. Based on the result, the expert decides whether the modifications should be accepted or whether the original automated proposal should be saved in the second magnetic resonance imaging system. Advantageously, the expert can influence the final result of the parameter adaptation and at the same time rely on automatically ascertained results as a basis for decision-making, which greatly reduces the expert's workload.

BRIEF DESCRIPTION OF THE DRAWINGS

The disclosure is explained in more detail below with reference to the attached figures and with reference to exemplary embodiments. The figures show.

DETAILED DESCRIPTION OF THE DISCLOSURE

Figure 1:
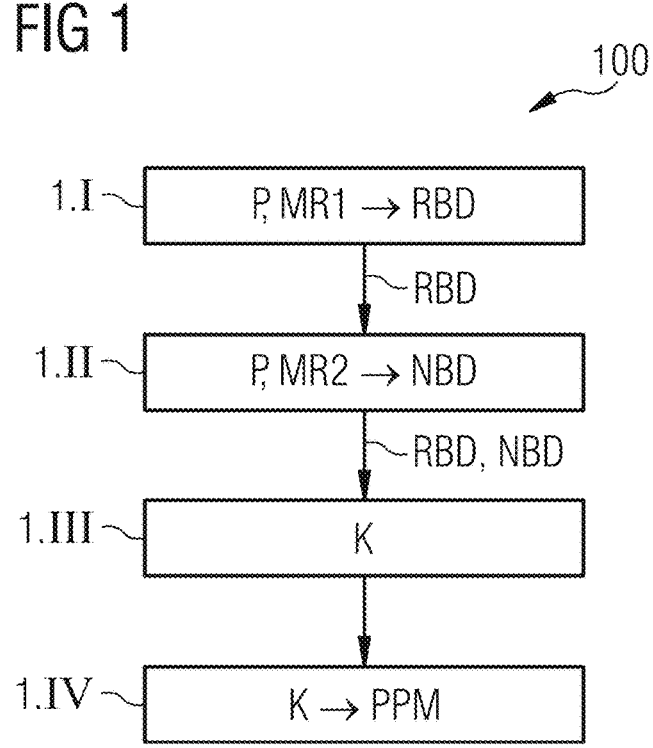
FIG. 1 illustrates a flowchart illustrating an example method for transferring an image impression between different magnetic resonance imaging systems, according to an exemplary embodiment of the disclosure.

FIG. 1 illustrates a flowchart illustrating an example method for transferring an image impression between different magnetic resonance imaging systems, according to an exemplary embodiment of the disclosure. Specifically, FIG. 1 shows a flowchart 100 illustrating a method for transferring an image impression between different magnetic resonance imaging systems.

In step 1.I, reference image data RBD is obtained from a phantom for a plurality of different protocols P for pulse sequences with different parameter settings on a first magnetic resonance imaging system MR1. The parameter settings may correspond to settings that generate an image impression optimized for the respective imaging purpose of the respective protocol. The image impression may also be adjusted to match the individual preferences of a specific user.

In step 1.II, new image data NBD is captured from the phantom on a second magnetic resonance imaging system MR2 for the plurality of different protocols P for pulse sequences with the different parameter settings of the second magnetic resonance imaging system MR2. Herein, it is initially advisable to select the same parameter settings for recording the new image data NBD as for recording the reference image data RBD with the first magnetic resonance imaging system MR1.

In step 1.III, a cost function K is generated that quantifies the similarity between the image impression of the new image data NBD and the image impression of the reference image data RBD.

In step 1.IV, the parameter settings on the second magnetic resonance imaging system MR2 are adjusted in dependence on a result of the cost function K, wherein adjusted protocol parameters PPM for the pulse sequence protocols of the second magnetic resonance imaging system MR2 are ascertained.

Figure 2:
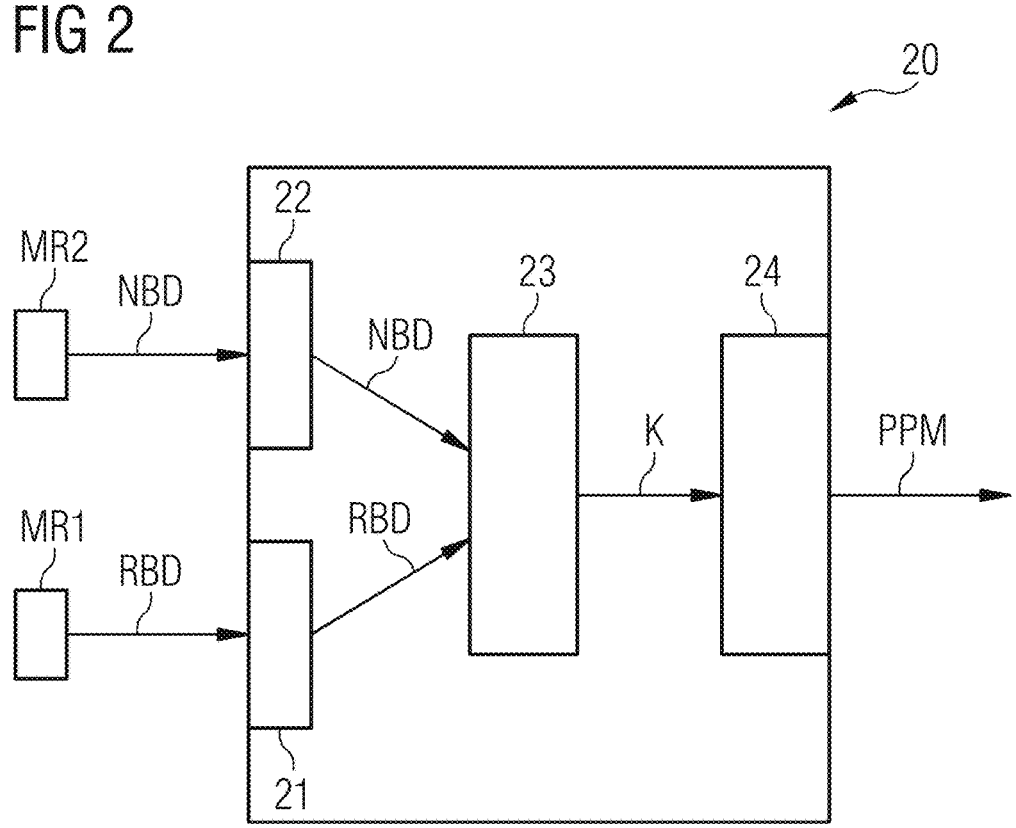
FIG. 2 illustrates a schematic representation of an example transfer facility, according to an exemplary embodiment of the disclosure.

FIG. 2 illustrates a schematic representation of an example transfer facility, according to an exemplary embodiment of the disclosure. Specifically, FIG. 2 is a schematic representation of a transfer facility (also referred to herein as a transfer apparatus, transfer device, or transfer circuitry) 20 according to an exemplary embodiment of the disclosure.

The transfer facility 20 comprises a reference data receiving unit (also referred to herein as reference data receiving circuitry or a reference data receiver) 21 for receiving reference image data RBD from a phantom for a plurality of different protocols for pulse sequences with different parameter settings using a first magnetic resonance imaging system MR1.

The transfer facility 20 also has an image data receiving unit (also referred to herein as image data receiving circuitry or an image data receiver) 22 for receiving new image data NBD from the phantom for the plurality of different protocols for pulse sequences with the different parameter settings from a second magnetic resonance imaging system MR2.

Furthermore, the transfer facility 20 comprises an ascertaining unit (also referred to herein as cost function ascertaining circuitry or a cost function generator) 23 for generating a cost function K, which quantifies the similarity between the image impression of the new image data NBD and the image impression of the reference image data RBD.

Part of the transfer facility 20 is also an adaptation unit 24 (also referred to herein as adaptation circuitry or an adapter) for adjusting the parameter settings in the second magnetic resonance imaging system in dependence on a result of the cost function K, wherein adapted parameter values PPM are ascertained.

Figure 3:
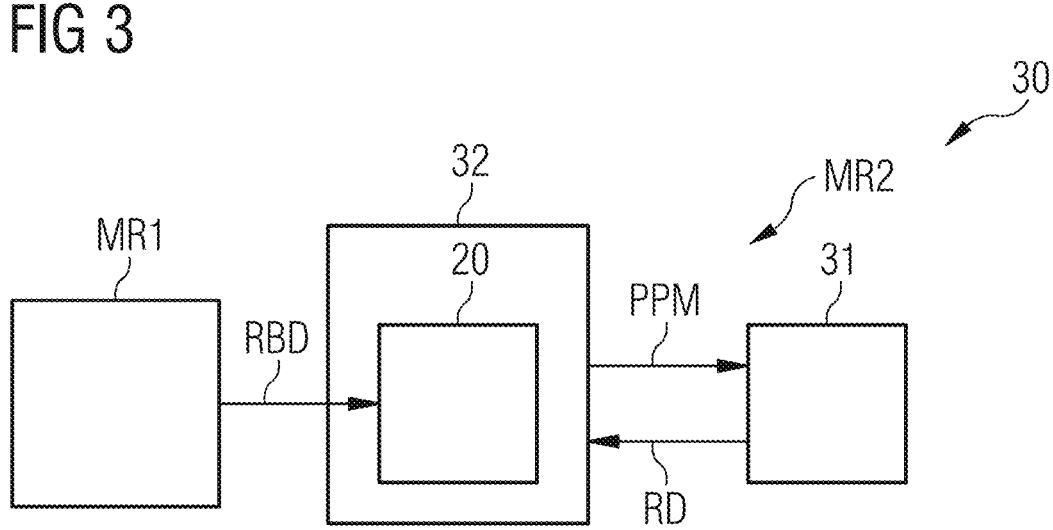
FIG. 3 illustrates a schematic representation of an example magnetic resonance imaging system, according to an exemplary embodiment of the disclosure.

FIG. 3 illustrates a schematic representation of an example magnetic resonance imaging system, according to an exemplary embodiment of the disclosure. Specifically, FIG. 3 is a schematic representation of an ensemble 30 consisting of a first magnetic resonance imaging system MR1 and a second magnetic resonance imaging system MR2 according to an exemplary embodiment of the disclosure. The magnetic resonance imaging system MR2 comprises a scanning unit 31 (also referred to herein as a scanner) and a control facility 32 (also referred to herein as control circuitry or a controller). The control facility 32 comprises a transfer facility, which may be identified with the transfer facility 20 shown in FIG. 2, for generating adjusted parameter values PPM. The second magnetic resonance imaging system MR2 receives from the first magnetic resonance imaging system MR1 reference image data RBD, which is used to adjust the image impression of the second magnetic resonance imaging system MR2 to the image impression of the first magnetic resonance imaging system MR1.

Reference is made once again to the fact that the methods and apparatuses described above are exemplary embodiments of the disclosure, and that the disclosure can be varied by the person skilled in the art without departing from the scope of the disclosure as specified in the claims. For purposes of completeness, reference is also made to the fact that the use of the indefinite article "a" or "an" does not exclude the possibility that the features in question may also be present on a multiple basis. Likewise, the term "unit" does not exclude the possibility that the unit consists of a plurality of components, which can also be spatially distributed. Independent of the grammatical term usage, individuals with male, female or other gender identities are included within the term.

Additionally, the various components described herein may be referred to as "units." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, as applicable and relevant, may alternatively be referred to herein as "circuitry," "controllers," "processors," or "processing circuitry," or alternatively as noted herein.

What is claimed is:

1. A method for transferring an image impression between different magnetic resonance imaging systems, comprising:
   generating reference image data from a phantom, for a plurality of different pulse sequence protocols with different parameter settings, using a first magnetic resonance imaging system;
   generating new image data from the phantom, for the plurality of different pulse sequence protocols with different parameter settings, using a second magnetic resonance imaging system different from the first magnetic resonance imaging system;
   ascertaining adapted parameter values for the different parameter settings of the second magnetic resonance imaging system based on a result of a cost function that quantifies a similarity between an image impression of the new image data and an image impression of the reference image data; and
   adjusting parameter settings in the second magnetic resonance imaging system with the adapted parameter values.

2. A transfer facility, comprising:
   a reference data receiving unit for receiving reference image data from a phantom, for a plurality of different pulse sequence protocols with different parameter settings, from a first magnetic resonance imaging system;
   an image data receiving unit for receiving new image data from the phantom, for the plurality of different pulse sequence protocols with the different parameter settings, from a second magnetic resonance imaging system;
   an ascertaining unit for ascertaining adapted parameter values for the different parameter settings of the second magnetic resonance imaging system based on a result of a cost function that quantifies a similarity between an image impression of the new image data and an image impression of the reference image data; and
   an adaptation unit for adjusting parameter settings in the second magnetic resonance imaging system with the adapted parameter values.

3. A non-transitory computer program product comprising instructions which, when executed by a computer, cause the computer to transfer an image impression between different magnetic resonance imaging systems, by:
   generating reference image data from a phantom, for a plurality of different pulse sequence protocols with different parameter settings, using a first magnetic resonance imaging system;
   generating new image data from the phantom, for the plurality of different pulse sequence protocols with different parameter settings, using a second magnetic resonance imaging system different from the first magnetic resonance imaging system;
   ascertaining adapted parameter values for the different parameter settings of the second magnetic resonance imaging system based on a result of a cost function that quantifies a similarity between an image impression of the new image data and an image impression of the reference image data; and
   adjusting parameter settings in the second magnetic resonance imaging system with the adapted parameter values.

4. The method as claimed in claim 1, wherein the first magnetic resonance imaging system and the second magnetic resonance imaging system differ with respect to at least one of the following features:
   hardware; and
   software used for imaging.

5. The method as claimed in claim 1, wherein the different parameter settings are, for the plurality of different pulse sequence protocols with different parameter settings, assigned a different imaging program and/or a different pulse sequence protocol.

6. The method as claimed in claim 1, wherein the adjustment of the parameter settings is carried out such that a result of the cost function is optimized to represent an optimum similarity between the reference image data and the new image data.

7. The method as claimed in claim 1,
   wherein, in addition to the similarity of the image impression of the new image data and the image impression of the reference image data, the cost function further comprises additional criteria with which additional objectives are pursued.

8. The method as claimed in claim 1, wherein the similarity between the image impression of the new image data and the image impression of the reference image data is characterized by at least one of the following measured variables:
   gray values of the voxels of the image data;
   contrast;
   signal-to-noise ratio; and
   image resolution.

9. The method as claimed in claim 1, wherein the different parameter settings comprise parameters which influence and/or change the image impression.

10. The method as claimed in claim 1, wherein the different parameter settings which influence and/or change the image impression comprise one of the following parameters:
    a filter parameter
    a repetition time
    an echo time
    contrast; and
    an acceleration factor.

11. The method as claimed in claim 1, wherein an automated adjustment of the parameters of the protocols takes place in the second magnetic resonance imaging system.

12. The method as claimed in claim 7, wherein the additional objectives comprise one of the following objectives:
    an acquisition time;
    an activation of a special acceleration technique as a specific way to influence the acquisition time;
    an energy consumption; and
    functionalities to improve image quality.

13. The method as claimed in claim 10, wherein the different parameter settings do not comprise the following parameters:
    a slice resolution;
    a number of pixels;
    an image geometry;
    a positioning of the phantom;
    navigator parameters; and
    a coil setting.

* * * * *